United States Patent Office 3,106,099
Patented Oct. 8, 1963

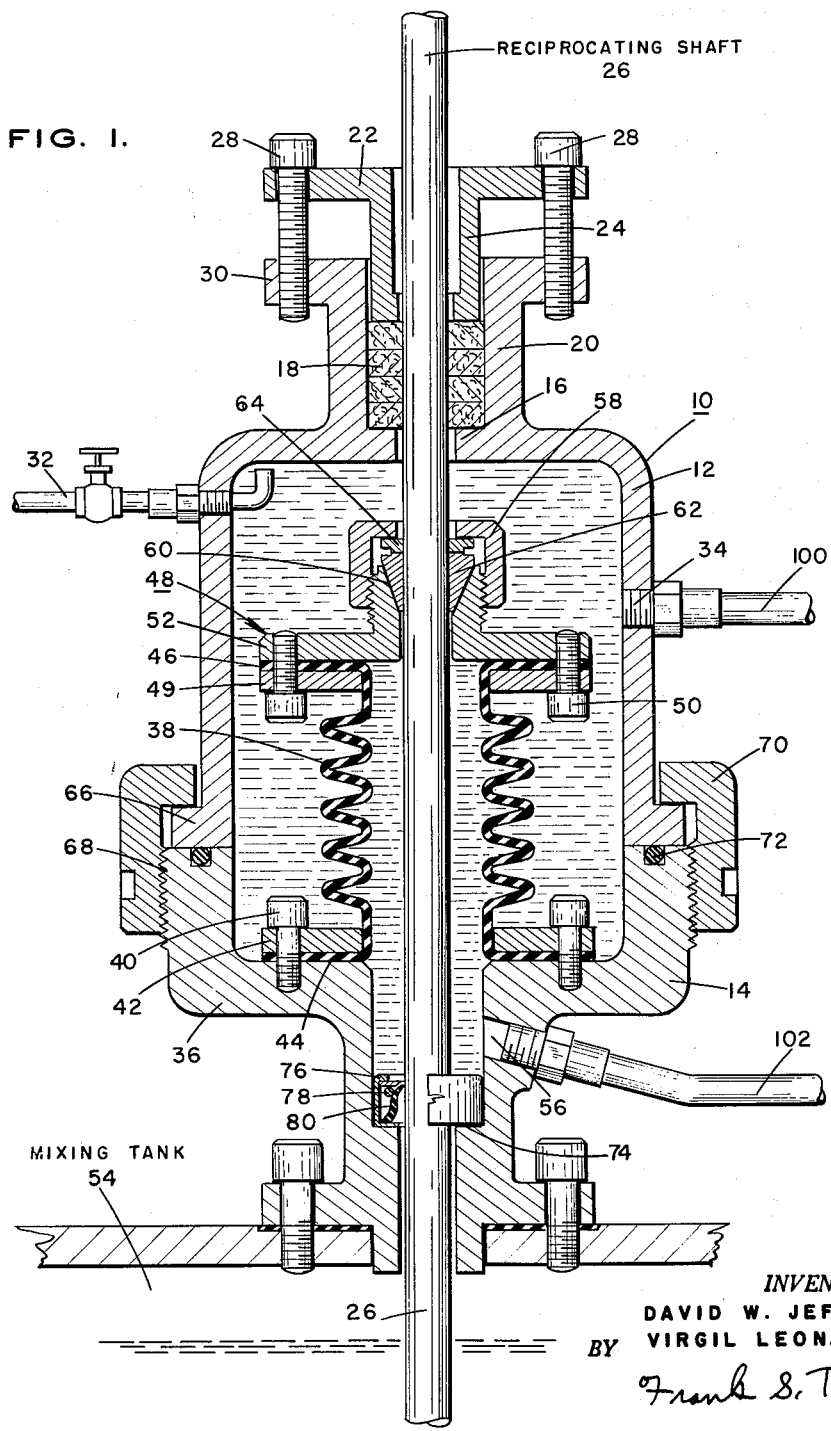

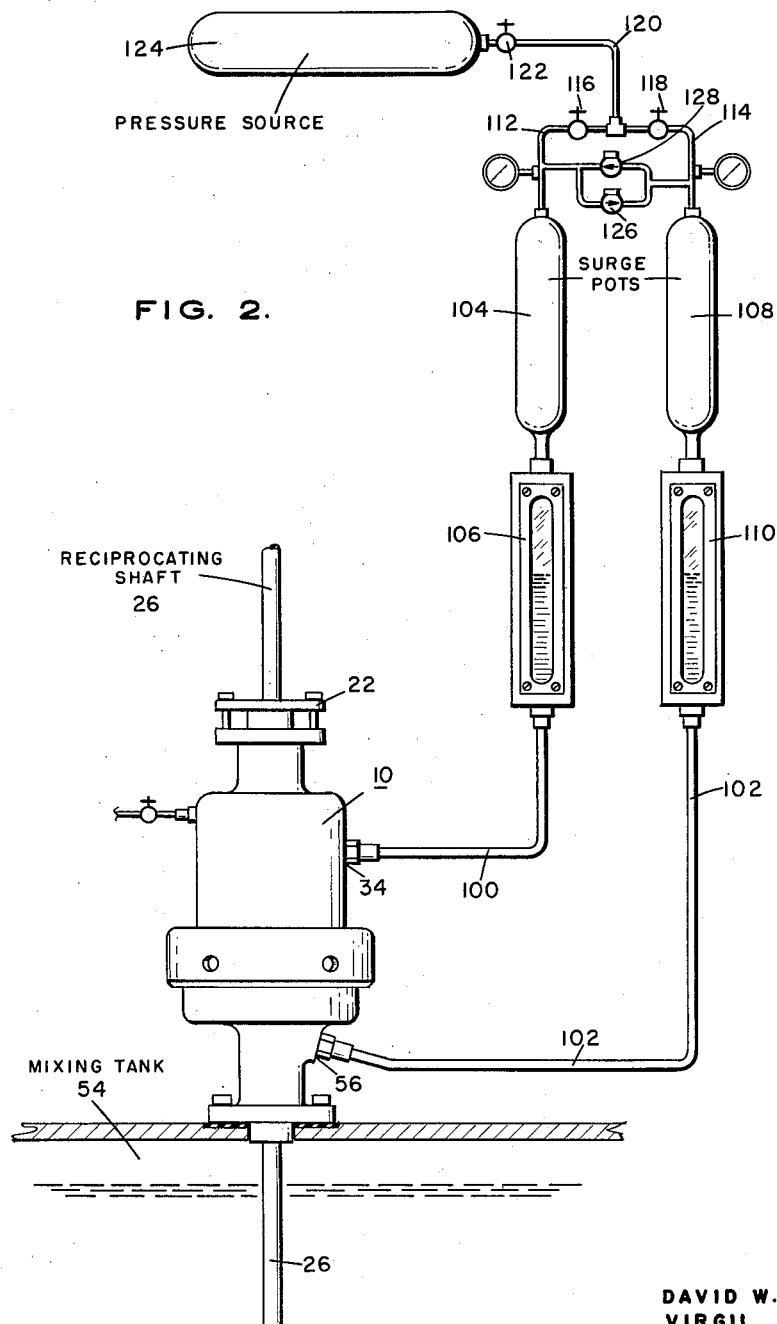

3,106,099
FLUID SEAL FOR A RECIPROCATING SHAFT
David W. Jeffrey and Virgil Leonard, Baytown, Tex., assignors, by mesne assignments, to Esso Research and Engineering Company, Elizabeth, N.J., a corporation of Delaware
Filed Nov. 9, 1960, Ser. No. 68,237
3 Claims. (Cl. 74—18.2)

This invention relates to fluid seal arrangements for reciprocating shafts extending into a vessel containing fluid under pressure.

The sealing of a corrosive fluid or a fluid of low viscosity under high pressure is a difficult task with a reciprocating shaft and a conventional packing gland. For example, reciprocating shafts are often used for mixing fluids within a vessel with at least one of these fluids being of a corrosive nature. The corrosive fluid corrodes the shaft so that after a short period of time, the fluid seal by the conventional packing glands becomes ineffective.

This invention is a new fluid sealing arrangement for a reciprocating shaft extending into a vessel which is particularly effective when the vessel contains corrosive fluids and/or low viscosity fluids under high pressure.

Briefly described, the invention includes a conventional packing arranged about the reciprocating shaft. Arranged within a housing and below the conventional packing is a bellows made of a noncorrosive material such as Teflon. The inside of the bellows is exposed to the internal pressure within the vessel containing the fluids to be mixed. The housing in which the bellows is mounted is filled with a noncorrosive, viscous fluid which is in contact with the outside of the bellows and the conventional packing gland. Thus, since a noncorrosive, viscous fluid is in contact with the conventional packing gland, the shaft is not corroded and the pressure seal is effective.

The invention as well as its many advantages will be further understood by reference to the following detailed description and drawings in which:

FIG. 1 is a sectional elevational view showing the sealing arrangement attached to a vessel containing fluids to be mixed; and FIG. 2 is a schematic view showing the new sealing arrangement and the elements located external to the housing of the sealing arrangement for maintaining pressure on the noncorrosive fluid within the housing and the internal fluid inside the bellows.

Referring to FIG. 1, the sealing arrangement includes a housing 10 which may be made up of an upper assembly 12 and a lower assembly 14. The upper assembly 12 has a circular shoulder 16. The conventional packing 18 is placed in the neck 20 of the upper assembly 12. A packing gland 22 having a downwardly extending portion 24 in contact with the conventional packing 18 is used to fluidly seal the conventional packing 18 against the reciprocating mixing shaft 26. The downwardly extending portion 24 of packing gland 22 is pressed against the conventional packing 18 by means of threaded bolts 28 extending through the flange of the packing gland 22 and a flange 30 of the upper assembly 12. Portions 16, 18, 20, 22, 24, 28, and 30 comprise what is commonly referred to as a "stuffing box."

The upper assembly 12 is filled with a non-corrosive fluid. The upper assembly 12 is also provided with a gas bleed off 32 and an external fluid outlet 34.

The base 36 of the lower assembly 14 has connected thereto a bellows 38. The lower portion of bellows 38 is connected to base 36 by means of bolts 40 extending through the bellows flange 42, the lower portion 44 of the bellows 38, and into the base 36. The upper portion 46 of the bellows 38 is connected to a bellows seal 48 by means of bolts 50 extending through an upper bellows flange 52, the upper portion 46 of the bellows 48, and a flange 49 of the bellows seal 48. Flanges 42 and 49 are split flanges to enable them to be put on and taken off the bellows.

The internal diameter of the bellows is of a larger diameter than the diameter of the shaft 26 so that the inside of the bellows 38 is in fluid contact with the inside of the vessel 54. An internal fluid outlet 56 is provided in the neck of the lower assembly 14 for exit of the internal fluid of the bellows due to displacement by movement of the bellows.

The bellows seal 48 has a threaded portion adapted to engage threads of a nut 58. The internal diameter of the bellows seal 48 continually decreases from the top thereof as at 60. The continually decreasing diameter of the bellows seal 48 receives a cone 62. The inside diameter of the cone 62 may be pressed into fluid sealing engagement against the shaft 26 by tightening the nut 58 which works against a force exerting member 64 which securely wedges the cone 62 into fluid tight engagement against the shaft 26.

The upper assembly 12 of housing 10 includes an external shoulder 66. The lower assembly 14 is threaded at 68 to mate with threads of a lock nut 70. An O-ring 72 is provided between the upper assembly and the lower assembly to seal the external fluid when the upper assembly 12 and the lower assembly 14 are connected into seal tight engagement by means of lock nut 70.

The neck of the lower assembly 14 includes an upwardly facing shoulder 74. A liquid seal 76 including an annular metal spring 78 which presses against a Teflon cup packer 80 is mounted on the shoulder 74. The liquid seal 76 permits slow displacement of fluid upwardly into the internal fluid chamber and downwardly into the vessel 54. The primary purpose of the liquid seal 76 is to prevent pressure surges from being transmitted to the inside of vessel 54.

As the shaft 26 is reciprocated, the bellows 38 connected thereto also reciprocates. This causes some displacement of the fluid in upper assembly 12 and the internal fluid working against the inside of bellows 38. Thus, some means should be arranged for damping or absorbing these fluid displacements. Also, if a high pressure is exerted against the inside of bellows 38 with such pressure being normally high enough to rupture the bellows 38, the differential pressure across the bellows can be minimized by applying pressure to the external fluid in housing 10, thus substantially increasing the usefulness of the seal arrangement.

Referring to FIG. 2, a damping and pressure exerting means is shown connected to housing 10 and forming part of the sealing arrangement.

A liquid conduit 100 is shown connected to the external fluid outlet 34. A second liquid conduit 102 is shown connected to the internal fluid outlet 56. Liquid conduit 100 is connected to a surge pot 104 through a sight glass level gauge 106. Fluid conduit 102 is connected to a surge pot 108 through a sight glass level gauge 110. Gas conduits 112 and 114 interconnect the surge pots 104 and 108 and are controlled by means of valves 116 and 118. A gas conduit 120 controlled by valve 122 leads from a pressure source such as a nitrogen cylinder 124 to the gas conduits 112 and 114.

In operation, when the sealing arrangement is initially attached to the vessel 54, the valves 122, 116, and 118 are open and nitrogen or other gaseous material is flowed through gas line 120 and gas lines 112 and 114 into the surge pots 104 and 108 to exert pressure against the top of the liquid contained in liquid conduits 100 and 102.

The pressures thus exerted against the internal fluid and the external fluid in housing 10 may then be made equal to decrease the differential pressure across the bellows 38. Valve 122 is then closed and valves 116 and 118 kept open.

If the reciprocating shaft 26 reciprocates to perform the mixing of the liquids in the high pressure vessel 54, the bellows which also reciprocates, causes some displacement of the external fluid and internal fluid. This displacement is damped or absorbed by means of the gas under pressure in surge pots 104 and 108. Also, if the internal fluid pressure should increase or decrease suddenly, the pressure within surge pots 104 and 108 is equalized through flow of gas through lines 114 and 112.

If the internal fluid has a high vapor pressure such that the external fluid might be contaminated through the vapor phase in lines 112 and 114, then after equalization of the pressure in surge pots 104 and 108, the valves 116 and 118 are closed. Thus, the corrosive internal fluid is completely isolated from the external fluid. In the latter case, the bellows is protected against rupture by a sudden increase or decrease in the internal fluid pressure by means of the dual safety valves 126 and 128 which each open in opposite directions of flow.

We claim:

1. A fluid seal arrangement for a reciprocating shaft extending into a vessel containing fluid under pressure comprising: a housing, a shoulder on the housing and adjacent said shaft; fluid sealing means on said shoulder; a packing gland for pressing the fluid sealing means into fluid sealing engagement against the shaft; a bellows mounted within said housing below the fluid sealing means and secured to said housing in a fluid tight manner, said bellows being coaxial with the shaft and of larger inside diameter than the diameter of said shaft so that the inside of the bellows is in fluid communication with the inside of the vessel; means for locking the top of the bellows to the shaft; said housing being filled with fluid outside of the bellows and having a port in fluid communication internally of the housing and externally of the bellows, and a port in fluid communication internally of the bellows; pressure means external to the housing and fluidly connected to said ports; and means for selectively supplying pressure fluid to each of said ports, and including means for damping pressure surges engendered by movements of the bellows and the shaft.

2. A fluid seal arrangement for a reciprocating shaft extending into a vessel containing fluid under pressure comprising: a housing; a shoulder on the housing and adjacent said shaft; fluid sealing means on said shoulder; a packing gland for pressing the fluid sealing means into fluid sealing engagement against the shaft; a bellows mounted within said housing below the fluid sealing means and secured to said housing in a fluid tight manner, said bellows being coaxial with the shaft and of larger inside diameter than the diameter of said shaft so that the inside of the bellows is in fluid communication with the inside of the vessel; means for locking the top of the bellows to the shaft; said housing being filled with fluid outside of the bellows and having a first port in fluid communication internally of the housing and externally of the bellows, and a second port in fluid communication internally of the bellows; a liquid conduit connected to the first port; a liquid conduit connected to the second port; a surge pot operably connected to each of said two liquid conduits and initially filled with a gaseous material; and valve controlled gas pressure conduits interconnecting said two surge pots whereby initially applied pressure may be equalized in said two surge pots, and the pressure surges in response to liquid displacement caused by reciprocal movement of the bellows are damped by the surge pots.

3. A fluid seal arrangement in accordance with claim 2 wherein a liquid seal is mounted within said housing and about the shaft at a point below the second port, said liquid seal permitting fluid pressure communication from the inside of the vessel to the inside of the bellows while preventing sudden fluid displacement into the vessel.

References Cited in the file of this patent

UNITED STATES PATENTS

| | | |
|---|---|---|
| 2,805,679 | Schrameck | Sept. 10, 1957 |
| 2,832,223 | Couraud | Apr. 29, 1958 |
| 2,912,867 | Gallant | Nov. 17, 1959 |